United States Patent [19]

Carroll

[11] Patent Number: 4,809,000
[45] Date of Patent: Feb. 28, 1989

[54] TRANSOM MEMBER FOR SLIDING DOORS

[76] Inventor: Noel Carroll, Sherbrooke Road, Sherbrooke, Victoria, Australia

[21] Appl. No.: 391,903

[22] Filed: Jun. 25, 1982

[30] Foreign Application Priority Data

Sep. 4, 1981 [AU] Australia .............................. PF0592
Dec. 2, 1981 [AU] Australia .............................. 78157/81
Dec. 2, 1981 [AU] Australia .............................. 78158/81

[51] Int. Cl.[4] .......................... G01S 13/04; E05F 15/20
[52] U.S. Cl. ........................................ 342/61; 49/25; 49/31
[58] Field of Search ................. 49/25, 31; 343/7 ED; 342/61

[56] References Cited

U.S. PATENT DOCUMENTS 3,497,995  3/1970  Forsberg .......................... 49/31 X
4,009,476  2/1977  Lutz ................................. 343/7 ED

FOREIGN PATENT DOCUMENTS 2165755  10/1973  France .............................. 343/7 ED Primary Examiner—T. H. Tubbesing
Attorney, Agent, or Firm—Ladas & Parry

[57] ABSTRACT

A transom member for a sliding door having an elongate support member and a cover member secured to the support member. The transom member has a cavity defined between the support member and cover member and sensing means for sensing approach of a person towards the transom member is housed in the cavity. The sensing means includes an energy detector for detecting energy from a person approaching the transom member, and the detector is positioned for receiving such energy through the cover member.

16 Claims, 5 Drawing Sheets

TRANSOM MEMBER FOR SLIDING DOORS

BACKGROUND OF THE INVENTION

1. FIELD OF THE INVENTION

This invention relates to transom members for sliding doors.

2. BRIEF SUMMARY OF THE INVENTION

According to the present invention there is provided a transom member for a sliding door having an elongate support member and a cover member secured to the support member, a cavity being defined between the support member and cover member, sensing means for sensing approach of a person towards the transom member being provided, said sensing means including an energy detector for detecting energy from a person approaching the transom member, said sensing means being positioned within said cavity with said detector being positioned to receive said energy through said cover member.

BRIEF DESCRIPTION OF THE DRAWINGS

The invention is further described with reference to the accompanying drawings in which.

DETAILED DESCRIPTION

Figure 1:
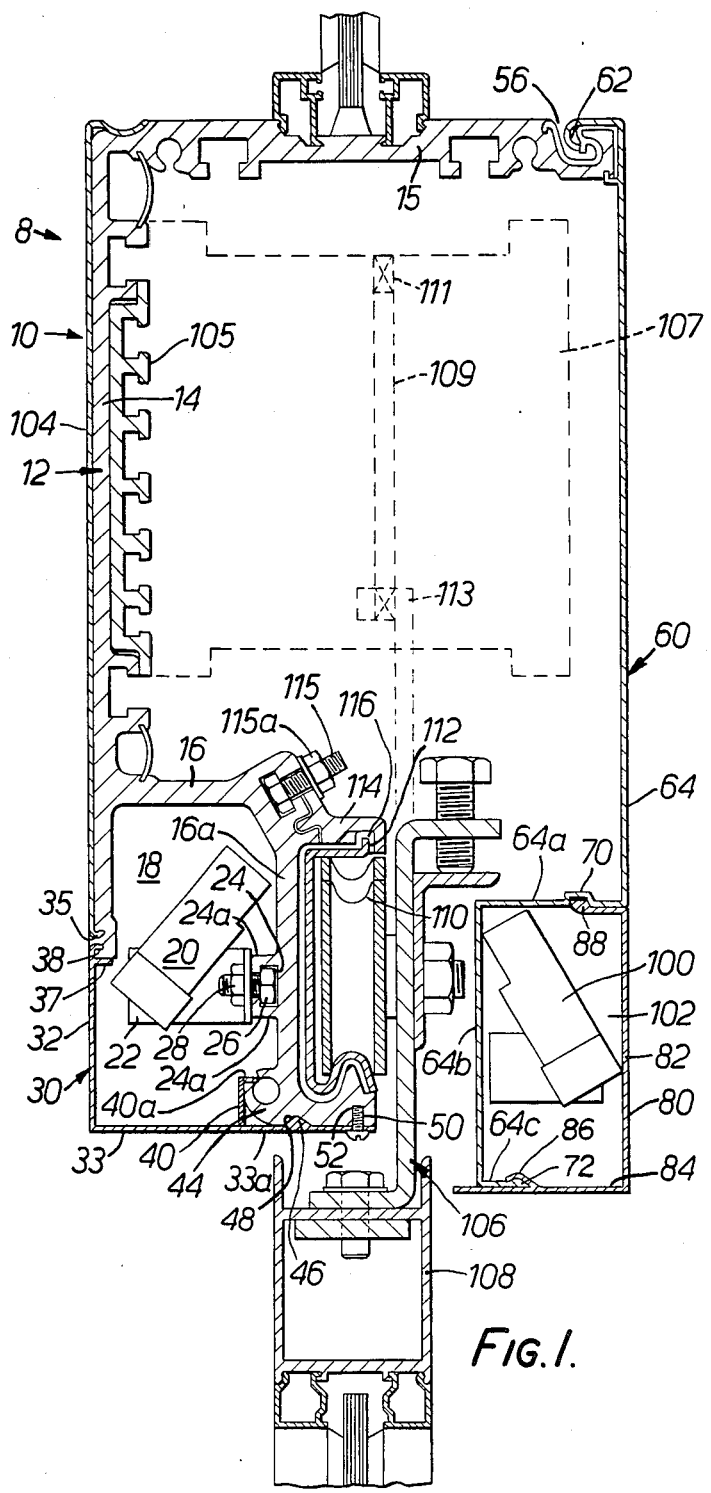
FIG. 1 is a transverse cross-section of a transom member constructed in accordance with the invention.

Referring firstly to FIG. 1, a sliding door assembly 8 is shown therein as including a transom member 10 which in use extends above a door opening. The transom member includes a lengthwise extending track member 112 and a carriage 106 is supported for lengthwise movement along the track member by means of support wheels 110. A door panel 108, which is normally aluminum framed, is hangingly supported from the carriage 106 for slidable movement with the carriage in its own plane.

The assembly 8 is arranged for power actuation. The precise means whereby this actuation is effected may be in accordance with well known practice and does not form part of this invention. However, briefly, the transom member 10 carries at its inner face a support plate 105 to which an electric motor 107 (shown by phantom lines) is mounted. Motor 107 is arranged for turning one of two sprocket wheels mounted at opposite ends of a transom. One of the sprocket wheels is shown by phantom lines, being designated by reference numeral 109 in FIG. 1. A chain 111 (shown in phantom) runs in a loop around the sprocket wheels, presenting two runs one above the other of which the upper run only being visible. The lower run is connected to an extension 113 (also shown by phantom lines) on carriage 106 so that by operating the motor 107 sprocket 109 is turned to move the chain 111 around its loop thus moving the carriage 106 and panel 108.

A sliding door assembly having the features as described above is disclosed in more detail, in for example, Australian Patent Specification 467591 the contents which are hereby incorporated to form part of the disclosure of the present specification.

The transom member 10 of FIG. 1 includes a support member 12 in the form of an aluminium extrusion. The support member 12 includes an upstanding front web portion 14, a rearwardly extending upper flange 15 and a rearwardly extending lower flange 16. Flange 16 extends from portion 14 at a location a short distance above the lower edge of portion 14 and includes a downwardly extending end portion 16a which extends generally parallel to portion 14. Flange end portion 16a extends downwardly somewhat below the lower edge of web portion 14. A cavity 18 is defined between portion 16a and the lower part of web portion 14. A sensing device 20 is positioned within cavity 18, being carried by a bracket 22 which is itself secured to the flange end portion 16a on of member 12. Member 12 includes an elongate slot 24 formed between two forwardly extending ribs 24a on flange end portion 16a. A bolt 26 has its head maintained captive in slot 24 but freely slidable along the length of the slot. The shank of the bolt 26 extends outwardly from the slot 24 and through an opening (not shown) in bracket 22. A nut 28 is threadedly engaged on the free end of bolt 24 and tightened down so as to lock the bracket 22 in position at any desired location along the length of the slot 24. By releasing the nut 28 it is possible to so loosen the connection between the bracket and member 12 as to permit the bolt, bracket 22 and sensing device to move along slot 24.

An L-shaped section plastic cover member 30 is removably positioned on member 12. Member 30 defines a first upstanding flange 32 and a second, lower, rearwardly extending flange 33. Flange 32 extends downwardly from the lower edge of web portion 14 of member 12 and flange 33 extends rearwardly to a position adjacent the lower end of flange end portion 16a on member 12. Cover member 30 is a snap-fit on to the member 12. In this regard, the flange 32 carries two rearwardly extending ridges 35, 37 which extend lengthwise of the member 30 and of which ridge 35 is received in a slot 38 in web portion 14 of member 12 and ridge 37 resiliently engages the lower edge of the web portion 14 of member 12. Flange 33 carries an upstanding inverted L-shaped flange 40 having an upper portion 40a which extends rearwardly. Portion 40a and a portion 33a of flange 33 extending rearwardly from the location of flange 40 resiliently grip therebetween an outstanding bead 44 defined on flange end portion 16a on member 12. Portion 33a also defines an upstanding beading 46 which is received in a lengthwise extending slot 48 in the base of flange end portion 16a on member 12.

The member 30 is positioned on member 12 by moving it from left to right as shown in the drawing so that, on the one hand, the ridges 35 and 37 are, respectively, entered into the slot 38 and engaged with the lower surface of web portion 14 of member 12 while, on the other hand, the bead 44 is forced between the portion 33a of flange 33 and portion 40a of flange 40. During the latter movement, the portion 33a is downwardly resiliently biased as the beading 46 passes the underside of bead 44 until the beading 46 is aligned with the groove 48 whereupon upward movement of the portion 33a can occur to neatly fit the beading 46 into the groove 48. There is thus a kind of snap-fit between the bead 44 and the flange portions 40a and 33a. Withdrawal of the member 30 from the member 12 is resisted, in the front to rear direction, by virtue of the need to resiliently downwardly deform the flange portion 33a to allow the beading 46 to be released from the groove 48 and to pass the base of bead 44. Cover member 30 may if desired be further secured in position by means of machine screws 50 extending through openings in the flange portion 33a and into an elongate slot 52 in the lower face of flange end portion 16a on member 12. The groove 52 has opposed side faces of undulating configuration such that transverse sections of the groove 52 correspond to axial sections of a screw thread so that the screws 50 are accommodated in the groove by threaded engagement therewith.

A metal facia 60 is removably hinged to the member 12. More particularly, the member 12 has an elongate rubber lined groove 56 running along the upper surface of the flange 15 thereof and the facia 60 has a hooked upper flange 62 which is hingedly engaged with the groove 56. From flange 62, the facia 60 defines a downwardly depending web 64 which towards its lower end first extends forwardly at a portion 64a thereof and then extends downwardly, at a portion 64b thereof. Web 64 also includes a rearwardly extending flange 64c extending from the lower edge of web portion 64b. Web portion 64a has a groove 70 formed in the underside thereof and flange 64c has an upwardly extending bead 72 formed therealong at its free edge.

A second cover member 80 of plastic material is removably engaged with facia 60. Member 80 is of generally L-shaped configuration having an upstanding web portion 82 and a lower web portion 84 which extends forwardly from portion 82 to a location just forward of and immediately below flange 64c of web 64. A forwardly extending beaded flange 88 provided on the upper end of portion 82 of member 80 extends into the aforementioned groove 70 in the underside of web portion 64c on facia 60.

Lower web portion 84 carries a forwardly extending flange 86 on its upper surface this being of hooked formation arranged to be engaged over bead 72 so that the bead 72 is retained and gripped between the lower web portion 84 of member 80 and the flange 86.

Engagement of the cover member 80 with the facia 60 is effected by movement from right to left as shown in FIG. 1 so as, on the one hand, to engage the free end of the beaded flange 88 in the groove 70 and on the other hand to pass the bead 72 between the lower web portion 84 and the flange 86. The latter movement is accompanied by resilient deformation of the flange 86 to force it upwardly as the bead 72 is passed between the outer end of the flange 86 and the lower web portion 84 of member 80 whereafter, when the bead 72 is fully engaged as shown in the drawing, the flange 86 by virtue of its hooked configuration resiliently bears down upon the bead 72. The action of engagement of the flange 88 with groove 70 and of engagement of the bead 72 with the flange 86 and lower web portion 84 of cover member 80 is thus effected by a kind of snap-action.

A second sensing device 100 is positioned in a cavity 102 defined between the cover member 80 and the portions 64a, 64b of web 64.

There is a space between the flange end portion 16a on member 12 and the portion 64b of web 64. The carriage 106 for supporting the sliding door panel 108 is movable lengthwise of the transom 10 within this space. The track member 112 on which wheels 110 of carriage 106 run is mounted on flange end portion 16a of member 12. Track member 112 is held in position by a retainer strip 114 bolted to member 12.

Figure 4:
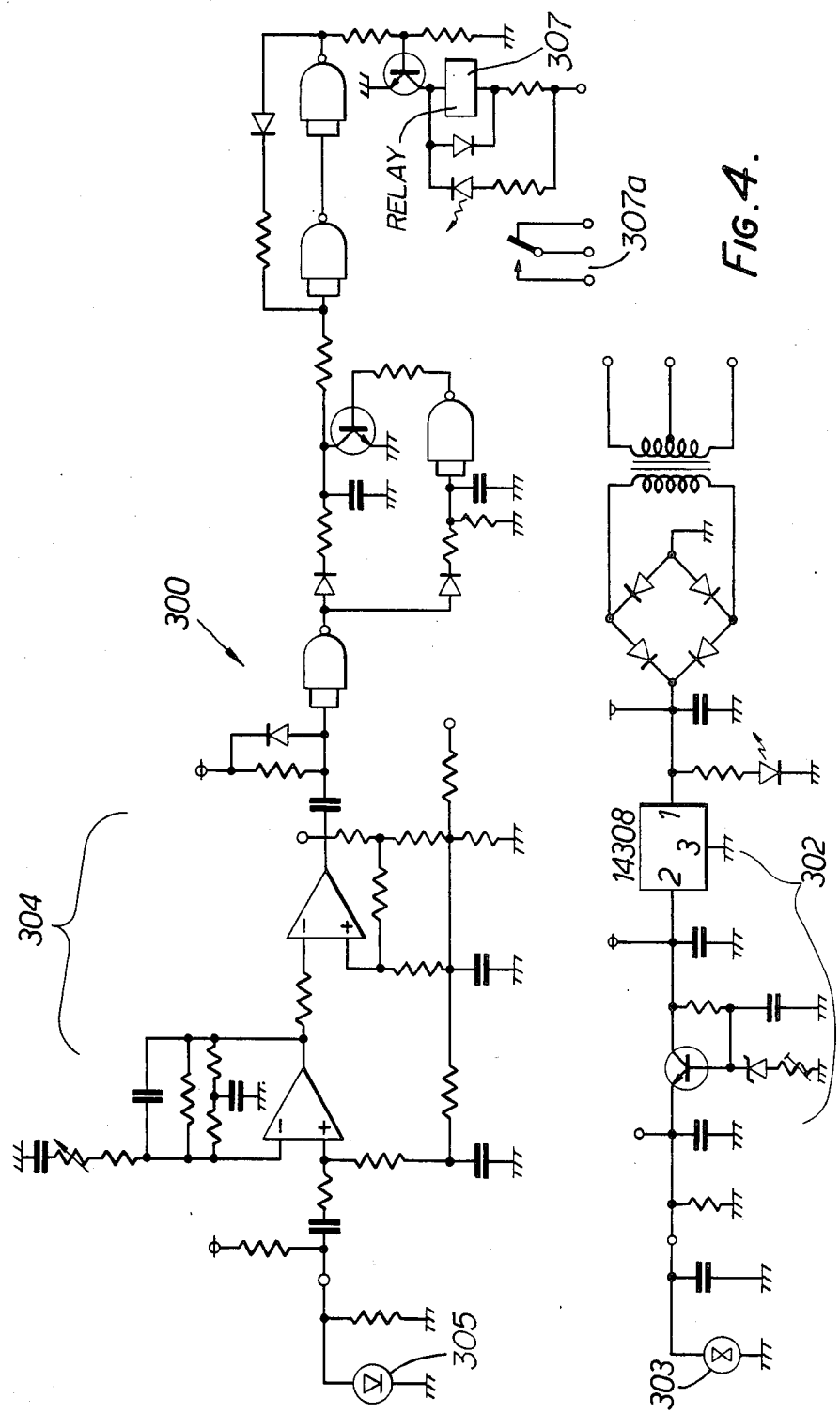
FIG. 4 is a circuit diagram of a detector device.

The sensing devices 20 and 100 are of similar form each being of a known type operable on application of electrical energy thereto to generate electromagnetic radiation which is directed outwardly away from transom member 10 to the respective side of member 10 to which that device is positioned, such radiation passing through the plastic cover members 30 and 80. Reflected radiation from the sensing devices, passing back from objects approaching the transom member and passing through the cover members 30, 80, is received by detectors within devices 20, 100. The devices 20 or 100 are coupled to the control circuitry for the door and include electrical circuitry operable on detection of changes in the received electromagnetic radiation occurring pursuant to approach of a person towards the transom member 10 to condition the control circuitry to cause the door panel 108 to move to an open position in a manner known per se. By way of example, FIG. 4 shows the electric circuit 300 of a suitable sensor device 20 or 100. Since, as indicated, the circuit designated by reference numeral 300 is conventional, its operation is not described in detail. Briefly, however, the circuit 300 includes a generator section 302 which operates to apply high frequency electric signal to a Gunn diode 303 which then emits microwave frequency electromagnetic radiation away from the sensor device. A detector section 304 includes a receiving diode 305 for detecting electromagnetic radiation and is able to detect variations in the frequency of the reflected radiation received by the sensor device. On detection of such variations, indicative of movement of an object in the field of radiated energy from diode 303, the detector section operates to energize a relay 307 the contacts 307a of which are interconnected into the electric circuit for controlling operation of the motor 107.

The transom member 10 has a metal facia 104 removably clipped to the front surface of member 12 and arranged in the same plane as the flange 32 of member 30 and extending from the top of the member 12 down to the upper edge of flange 32 so as to give a neat appearance to the front of the transom member 10.

The facia 60 is formed of pressed metal and, as shown, combines with the member 80 to present a neat appearance to the rear face of the facia.

Figure 2:
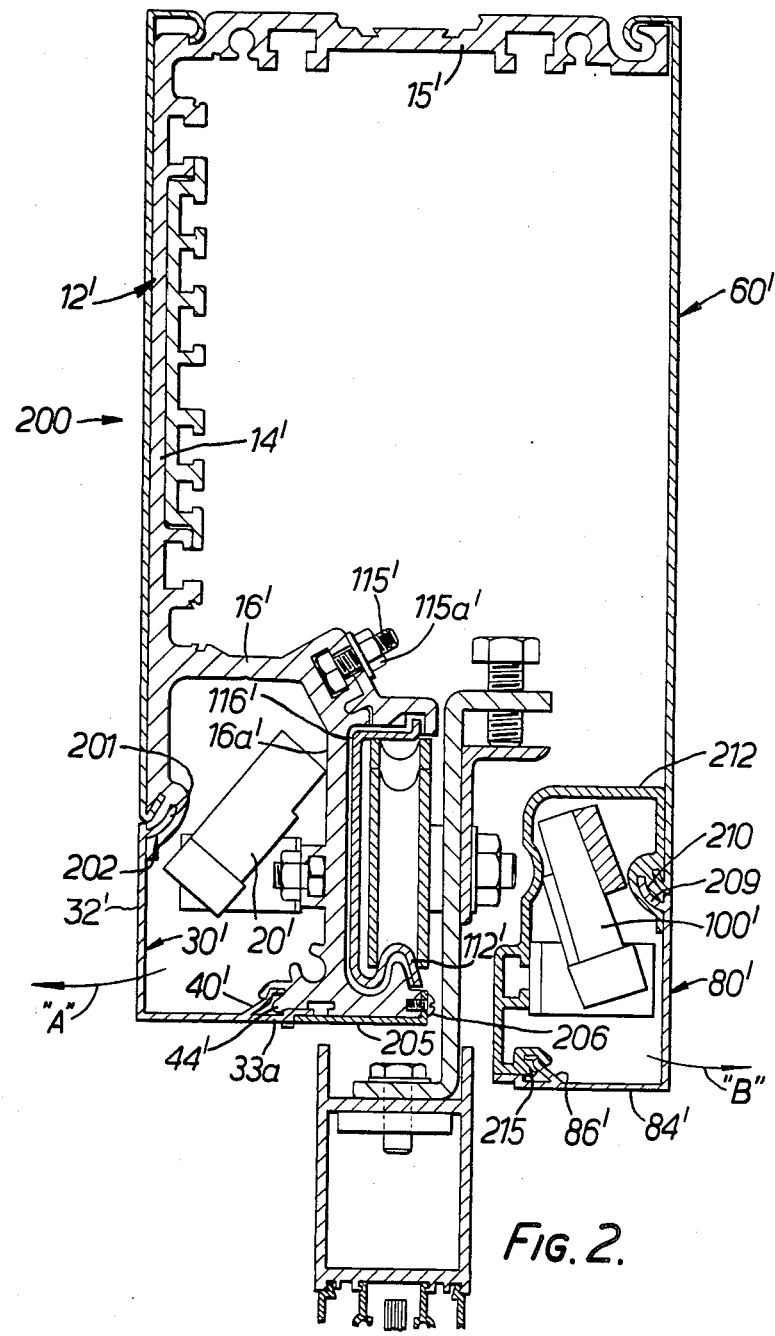
FIG. 2 is a transverse cross-section of a modified transom member constructed in accordance with the invention.

The transom member 200 of FIG. 2 is similar to transom member 10, similar parts in FIGS. 1 and 2 having corresponding, but "primed", reference numerals. The following description of the transom member 200 is confined to differences between the members 10 and 200.

First, the means whereby the cover member 30' and 80' of member 200 are attached differs as compared with transom member 10. The cover member 30' does not have the two ridges 35, 37 of cover member 30 and instead has a single inwardly extending ridge 201 on the front flange 32'. Ridge 201 is of arcuate cross-section and is retained in a complementary groove 202 in the support member 12' of transom member 200, so as to permit the member 30' to be swung forwardly, with the ridge 201 moving in groove 202. The direction of such swinging movement is indicated by the arrow "A" in FIG. 2. On such movement, the "front" sensing device 20' is exposed, such as for servicing. The form of the flange 40 and flange portion 33a of the member 30 is also varied in transom 200. More particularly, flange 40 is replaced by an angled flange 40' whilst the extreme rear portion 33a' is also of slightly different configuration to the corresponding portion 33a shown in FIG. 1. However, the flange 40' and portion 33a' cooperate with a bead 44' on member 12' to hold the lower part of the member 30' latched in position in a generally similar manner to FIG. 1. In order to securely hold the member 30' in position, the transom member 200 is provided with an elongate "L"-section, member 205 secured by screws 206 to the support member 12' this being removably positioned as shown to engage the lower edge of portion 33a' to stop downward movement of the member 30'.

The rear cover member 80' is also differently configured as compared with the member 80 shown in FIG. 1, having an arcuate ridge 209 at the upper part thereof which is slidably accommodated in a corresponding arcuate groove 210 in a channel section 212 secured by brackets (not shown) to member 12'. The ridge 209 cooperates with the groove 210 to permit swinging of the member 80' in the direction indicated by arrow "B" in FIG. 2 to provide access to the "rear" device 100'. At the lower part of member 80' the flange 86 in transom 80 is replaced by a modified flange 86'. A bead 215 on section 212 is gripped between flange 86' and lower web portion 84' of cover member 80', whereby to releasably secure the member 80' in position.

It is a particular feature of the constructions of both FIGS. 1 and 2 that the stainless steel track members 112 and 112' are clamped in position on the member 12 or 12' by action of the retainer strips 114, 114', as beforedescribed. More particularly, as shown, the retainer strips 114, 114' are, by action of tightening up of nuts 115a, 115a' on bolts 115, 115' (secured to and spaced along members 12, 12') moved downwardly and also to the left as shown in FIGS. 1 and 2 to bear upon the top part of the track members 112, 112' and to firmly grip the track members between the retainer strips 114, 114' and the lower parts of members 12 and 12', whilst at the same time ensuring that the track member is securely pressed towards the downwardly extending end portions 16a, 16a' of members 12 and 12'. This retention action occurring on tightening of bolts 115, 115' is due to the inclination of the axis of the bolts to both the vertical and horizontal. The aforementioned rubber mounting of the tracks is provided by rubber strips 116, 116' between the track members and the member 12, 12' and the retainer strips 114, 114'.

By making the cover members 30, 30', 80, 80' of opaque material, it is not possible for persons to ascertain usually the precise positioning of the sensing devices 20, 20', 100, 100' thereby rendering it more difficult for vandals to cause damage to the sensing devices.

Figure 3:
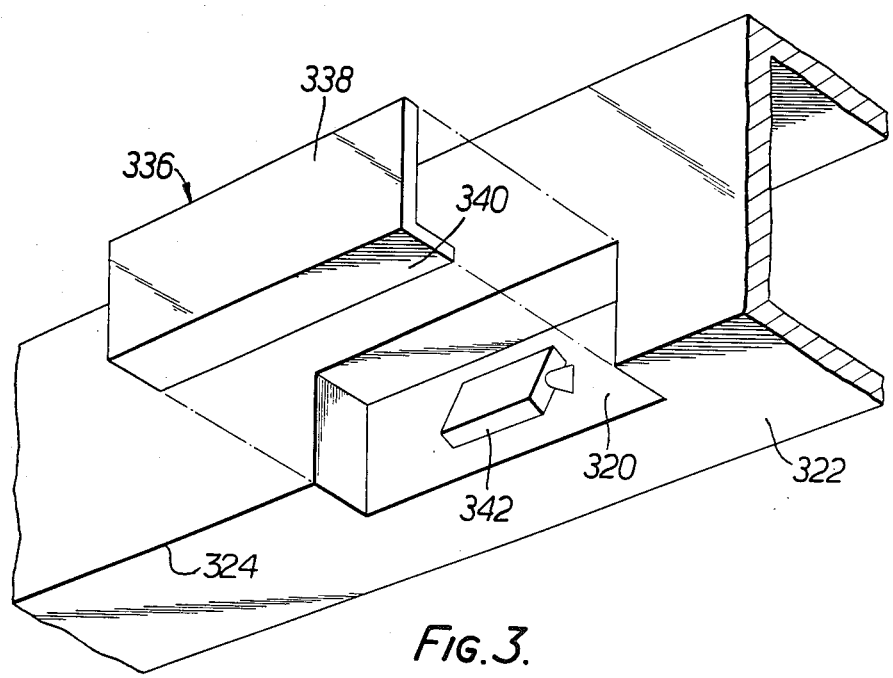
FIG. 3 is a fragmentary perspective view of a further modified transom member constructed in accordance with the invention.

FIG. 3 shows a still further modification to the invention where, instead of providing a cover member, such as the previously described cover member 30, which extends all along the length of the transom member and which together with the support member such as support member 12, defines an elongate compartment extending all along the transom member, simply has a small dimension recess 320 formed in a metal extrusion 322 forming the transom member. The recess 320 is formed adjacent the outer, lower edge 324 of the extrusion 322 and is covered with a plastic cover member 336 which is removable. Cover member 336 has an upward extending generally planar portion 338 and a rearwardly extending generally planer portion 340. In the assembled condition, the portion 340 is flush with the underside of the extrusion 322 whilst the portion 336 is flush with the forward upright face of the extrusion 322. A sensor device 342, similar to the previously described sensor devices such as device 20, is positioned in the compartment defined between recess 320 and cover member 336.

Figure 5:
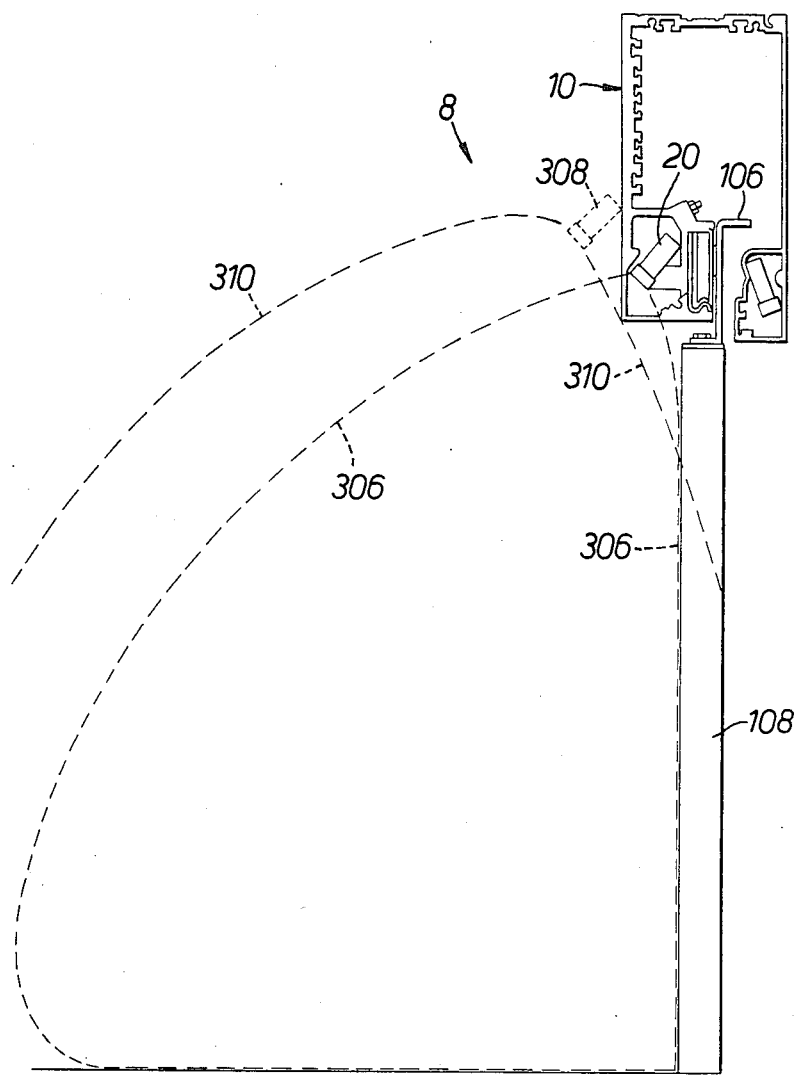
FIG. 5 is a diagram showing the effect of use of a transom member of the invention.

It has been found that the mounting of the sensor device such as sensor device 20 within the transom member itself provides for better operation of the sensor device. More particularly, FIG. 5 shows in diagrammatic form the door assembly 8 of FIG. 1, with its sensor device 20. Because of the internal mounting of the sensor device 20, the sensor device is located quite close to the door panel 108 and close to its median plane. As a result, the radiation pattern of radiation emitted from the diode 303, as shown by phantom lines 306 in FIG. 5, has the characteristic that whilst extending some distance outwardly from the door panel so as to enable proper sensing of persons approaching the door panel, it also extends down the front surface of the metal door panel. On the other hand, if the positioning of the sensor device is on the exterior of the transom member as shown by phantom lines 308 in FIG. 5, the sensor device is rather clear of the door panel and the pattern 310 of radiation is less clearly directed to encompass the door panel. It has been found that by positioning the sensoring device within the transom in accordance with this invention, the proximity of the sensor device and the door panel brings about the effect of the door panel acts as an antenna for assisting in radiation of electromagnetic radiation away from the sensor device. As a consequence of this, movement of the door panel in its own plane has been found to cause minimal interference with the field of the radiation and movement of the door is not perceived readily by the detector section 304 of the sensor device. On the other hand, with the sensor device positioned as shown by phantom lines 308, the door panel is positioned at a location where movement thereof is readily detectable by the sensor device. This has been found particularly inconvenient in practice because the sensitivity of the detecting means would then need to be decreased to a level where it does not respond to such movements of the door panel but only to movements of large objects in the field of radiation. Thus, the positioning of the sensor device 20 within the transom member and close to the door panel allows the sensor device to be set to have a greater sensitivity without interference in operation thereof. This positioning is particularly facilitated in that the sensor device is able to direct electromagnetic radiation downwardly at an angle to the horizontal from the cavity in which it is retained and through portions of the cover member, such as cover member 30, which extend upwardly from the front rear edge of the transom member and rearwardly from such edge.

While the invention has been specifically described in relation to embodiments including a sensor device generating and detecting energy in a particular form of electromagnetic radiation, namely microwave frequency radiation, it is possible to practise the invention using sensor devices generating and detecting other forms of energy, such as sound energy or infra-red radiation. Again, the sensor device may be of a kind not including an energy generator, but still responsive to energy, such as infra-red radiation, from a person approaching the device.

I claim:

1. A transom member for a sliding door having an elongate support member and a cover member formed of material opaque to visible radiation, the cover member being secured to the support member a cavity being defined between the support member and cover member with the cover member being mounted relative to the support member so as to provide and permit easy access to the cavity, sensing means for sensing approach of a person towards the transom member being provided, said sensing means including an energy detector for detecting energy from a person approaching the transom member, said sensing means being positioned within said cavity with said detector being positioned to receive said energy through said cover member, the location of the sensing means within the cavity not being apparent from external visual inspection of the transom member.

2. A transom member as claimed in claim 1, wherein said sensing means is mounted on the support member.

3. A transom member as claimed in claim 2, wherein the support member is provided with means mounting the sensing means for movement within said cavity and means for locking the sensing means at a predetermined location along the length of the transom member.

4. A transom member as claimed in claim 1, wherein the transom member defines an upright front surface and the cover member has a front face which is aligned in generally coplanar relationship with said front surface.

5. A transom member as claimed in claim 1, wherein the support member carries a further cover member secured to the support member so as to define a further cavity between the support member and said further cover member, a further sensing means being positioned within said further cavity said further sensing means including an energy detector for detecting energy from a person approaching the transom member; the cover members being positioned to opposed sides of said support member and adjacent respective ones of said cavities and sensing means, the said energy detector of each said sensing means being positioned to receive said energy through the adjacent said cover member.

6. A transom member as claimed in claim 1, wherein the cover member is pivotally mounted on said support member.

7. A transom member as claimed in claim 1, wherein the transom member defines a track for movement therealong of a carriage in use supporting the door panel for movement along the direction of extent of the transom member.

8. A transom member as claimed in claim 7, wherein said transom member presents an outer upright face and a lower generally horizontal face which meet at a lengthwise extending edge of the transom member, the cavity being located at said edge so as to extend away from the edge part way across said outer upright face and away from said edge partly across said lower face, said cover member having an upright portion and a lower portion, these respectively closing the cavity at said upright face and at said lower face.

9. A transom member as claimed in claim 8, wherein said sensing device includes a generator in said cavity for generating and directing energy outwardly from the transom member through said cover member for incidence on and reflection from a person approaching the transom member, the detector being effective to detect such reflected energy.

10. A transom member as claimed in claim 9, wherein said energy is microwave frequency electromagnetic radiation and the sensing means is located adjacent the door panel when the door panel is in a closed position so that the electromagnetic radiation from the sensing means then encompasses the door panel substantially over its whole height, and the door panel is made of metal, whereby the door panel acts as an antenna in assisting in direction of said electromagnetic radiation away from the transom member.

11. A transom member as claimed in claim 10, wherein said sensing device is positioned for direction of said energy from said generator through said cover member at both said portions.

12. A transom member as claimed in claim 1, wherein said transom member presents an outer upright face and a lower generally horizontal face which meet at a lengthwise extending edge of the transom member, the cavity being located at said edge so as to extend away from the edge part way across said outer upright face and away from said edge partly across said lower face, said cover member having an upright portion and a lower portion, these respectively closing the cavity at said upright face and at said lower face.

13. A transom member as claimed in claim 12, wherein said sensing device includes a generator in said cavity for generating and directing energy outwardly from the transom member through said cover member for incidence on and reflection from a person approaching the transom member, the detector being effective to detect such reflected energy.

14. A transom member as claimed in claim 13, wherein said sensing device is positioned for direction of said generator through both the upright portion and the lower portion of said cover member.

15. A transom member as claimed in claim 1 wherein said sensing device includes a generator for generating microwave frequency electromagnetic radiation and directing said radiation outwardly from the transom member through said cover member for incidence on and reflection from a person approaching the transom member, the detector being effective to detect reflected said microwave frequency electromagnetic radiation, and wherein the transom member supports a metal door panel for sliding movement therealong and the sensing means is located adjacent the door panel when the door panel is in a closed position whereby the electromagnetic radiation from the sensing means then encompasses the door panel substantially over its whole height and the door panel acts as an antenna for assisting in direction of said electromagnetic radiation away from said transom member.

16. A transom member as claimed in claim 1 wherein the cover member extends lengthwise substantially from side to side from said support member.

* * * * *